US006815473B2

(12) United States Patent
Robert et al.

(10) Patent No.: US 6,815,473 B2
(45) Date of Patent: Nov. 9, 2004

(54) RUBBER COMPOSITION USABLE AS A TIRE TREAD

(75) Inventors: Pierre Robert, Perignat-les-Sarlieve (FR); Jean-Michel Favrot, Cournon-d'Auvergne (FR); Corinne Fradin-Cohas, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 0 days.

(21) Appl. No.: 10/055,685

(22) Filed: Jan. 23, 2002

(65) Prior Publication Data

US 2002/0183436 A1 Dec. 5, 2002

Related U.S. Application Data

(63) Continuation of application No. PCT/EP01/05801, filed on May 21, 2001.

(30) Foreign Application Priority Data

May 26, 2000 (FR) .............................. 00 06875

(51) Int. Cl.⁷ ............................. C08K 3/36; C08K 3/04; C08J 3/22; B60C 11/00
(52) U.S. Cl. ....................... 523/215; 523/216; 523/351; 524/492; 524/495; 525/332.6; 525/332.7; 152/209.1
(58) Field of Search ................................ 523/351, 215, 523/216; 524/492, 495; 525/332.6, 332.7; 152/209.1

(56) References Cited

U.S. PATENT DOCUMENTS

| | | | |
|---|---|---|---|
| 3,108,994 A | 10/1963 | Zelinski et al. ............ 260/93.5 |
| 3,135,716 A | 6/1964 | Uranek et al. ............. 260/45.5 |
| 3,244,664 A | 4/1966 | Zelinski et al. ............ 260/41.5 |
| 3,842,111 A | 10/1974 | Meyer-Simon et al. ................... 260/448.2 E |
| 3,873,489 A | 3/1975 | Thurn et al. ......... 260/33.6 QA |
| 3,900,532 A | 8/1975 | Dietrich et al. ............ 260/879 |
| 3,978,103 A | 8/1976 | Meyer-Simon et al. ................... 260/448.8 R |
| 3,997,581 A | 12/1976 | Pletka et al. .......... 260/448.8 R |
| 4,002,594 A | 1/1977 | Fetterman ................ 260/42.37 |
| 4,072,701 A | 2/1978 | Pletka et al. .......... 260/448.8 R |
| 4,129,585 A | 12/1978 | Buder et al. .......... 260/448.8 R |
| 4,158,654 A * | 6/1979 | Moczygemba et al. |
| 4,780,507 A | 10/1988 | Gaku et al. ................. 525/113 |
| 4,950,721 A | 8/1990 | Dias et al. .................. 525/340 |
| 5,066,721 A | 11/1991 | Hamada et al. ............. 525/102 |
| 5,077,346 A | 12/1991 | Dias et al. .................. 528/383 |
| 5,489,627 A * | 2/1996 | Sandstrom |
| 5,580,919 A | 12/1996 | Agostini et al. ............ 524/430 |
| 5,583,245 A | 12/1996 | Parker et al. .............. 556/427 |
| 5,650,457 A | 7/1997 | Scholl et al. ............... 524/262 |
| 5,663,358 A | 9/1997 | Cohen et al. ............... 548/166 |
| 5,663,396 A | 9/1997 | Musleve et al. ............ 556/427 |
| 5,665,812 A | 9/1997 | Gorce et al. ................ 524/495 |
| 5,674,932 A | 10/1997 | Agostini et al. ............ 524/430 |
| 5,684,089 A | 11/1997 | Lanoye et al. .............. 525/237 |
| 5,684,171 A | 11/1997 | Wideman et al. ........... 556/427 |
| 5,684,172 A | 11/1997 | Wideman et al. ........... 556/427 |
| 5,696,197 A | 12/1997 | Smith et al. ................ 524/495 |
| 5,708,053 A | 1/1998 | Jalics et al. ................. 523/200 |
| 5,765,014 A | 6/1998 | Seki ..................... 395/800.18 |
| 5,852,099 A | 12/1998 | Vanel ......................... 524/494 |
| 5,892,085 A | 4/1999 | Munzenburg et al. ...... 552/427 |
| 5,900,449 A | 5/1999 | Custodero et al. .......... 524/430 |
| 5,902,856 A | 5/1999 | Suzuki et al. ............... 525/237 |
| 5,962,575 A * | 10/1999 | Yatsuyanagi et al. |
| 6,013,718 A | 1/2000 | Cabioch et al. ............. 524/506 |
| 6,071,995 A | 6/2000 | Labauze ..................... 524/269 |
| 6,372,855 B1 | 4/2002 | Chino et al. ............. 525/327.4 |
| 6,380,321 B1 | 4/2002 | Robert et al. ............... 525/383 |

FOREIGN PATENT DOCUMENTS

| | | |
|---|---|---|
| DE | 0139661 | 1/1980 |
| DE | 0236537 | 6/1986 |
| DE | 19941166 | 5/2000 |
| EP | 0735088 | 10/1996 |
| EP | 0810258 | 12/1997 |
| EP | 0877047 | 11/1998 |
| EP | 1043357 | 10/2000 |
| WO | 9637547 | 11/1996 |
| WO | 9928376 | 6/1999 |

OTHER PUBLICATIONS

Quirk et al. "Carbonation and related reaction of Poly(styryl)lithium," Macromolecules, (1989) 22:85–90.
English language abstract for Japanese Patent Application, JP07138411, May 30, 1995, "Rubber Composition for Low–Fuel Consumption Tire," Katsumi et al.
English language abstract for Japanese Patent Application, JP07138412, May 30, 1995, "Rubber Composition for High–Performance Tire," Katsumi et al.
English language abstract for Japanese Patent Application, JP07292159, May 30, 1995, "Rubber Composition," Katsumi et al.

* cited by examiner

Primary Examiner—Tae H. Yoon
(74) Attorney, Agent, or Firm—Burns, Doane, Swecker & Mathis, L.L.P.

(57) ABSTRACT

The present invention relates to a cross-linkable or cross-linked rubber composition having improved hysteresis properties in the cross-linked state which is useful for constituting a tire tread, to a process for preparation of such a cross-linkable composition, to a tread of this type and to a tire having reduced rolling resistance. The rubber composition according to the invention is based on:

an elastomeric matrix comprising at least one diene elastomer which comprises a carboxylic acid function at one or at each of its two chain ends, and a reinforcing filler comprising a reinforcing inorganic filler, wherein said diene elastomer has a molecular weight which is greater than 80,000 g/mol, and it is present in a majority quantity in said elastomeric matrix.

13 Claims, 2 Drawing Sheets

RUBBER COMPOSITION USABLE AS A TIRE TREAD

SPECIFICATION

This is a continuation of international application PCT/EP01/05801, filed May 21, 2001 and published as WO 01/92402 A1 in French on Dec. 6, 2001, which claims priority of French application 00/06875, filed May 26, 2000.

BACKGROUND OF THE INVENTION

The present invention relates to a cross-linkable or cross-linked rubber composition having improved hysteresis properties in the vulcanized state which is usable for constituting a tire tread, to a process for preparation of such a cross-linkable composition, to a tread of this type and to a tire having reduced rolling resistance.

Since fuel economies and the need to preserve the environment have become priorities, it has become desirable to produce mixes having good mechanical properties and as low a hysteresis as possible so that they can be processed in the form of rubber compositions usable for the manufacture of various semi-finished products involved in the constitution of tires, such as, for example, underlayers, sidewalls or treads, and in order to obtain tires having reduced rolling resistance.

To achieve such an objective, numerous solutions have been proposed, consisting in particular of modifying the structure of the diene polymers and copolymers at the end of polymerization by means of functionalizing, coupling or starring agents. The very great majority of these solutions have concentrated on the use of functionalized polymers which are active with respect to carbon black, with the aim of obtaining a good interaction between the polymer thus modified and the carbon black.

By way of illustration of this prior art relating to reinforcing fillers formed of carbon black, mention may for example be made of U.S. Pat. No. 3,135,716, which describes the reaction of living diene polymers at the chain end with a polyfunctional organic coupling agent in order to obtain polymers having improved properties. Mention may also be made of U.S. Pat. No. 3,244,664, which discloses the use of tetra-alkoxysilanes as coupling agents or starring agents for diene polymers.

Silica has been used as reinforcing filler in vulcanizable rubber compositions, in particular those intended to constitute tire treads, for a long time. However, this use has remained very limited, owing to the unsatisfactory level of certain physical properties of such compositions, in particular abrasion resistance.

This is why it has been proposed, in order to overcome these drawbacks, to use functionalized diene polymers instead of the non-functionalized polymers which were used before, and in particular polymers functionalized by alkoxysilane derivatives, such as tetraethoxysilanes. For example, mention may be made of U.S. Pat. No. 5,066,721, which describes a rubber composition comprising a diene polymer functionalized by an alkoxysilane having at least one non-hydrolyzable alkoxyl radical, which makes it possible to eliminate the polymerization solvent by steam stripping.

One disadvantage of these functionalization reactions lies in the coupling reactions which accompany them, which generally makes it necessary to use an excess of alkoxysilane and/or intensive mixing in order to minimize these coupling reactions.

Another drawback of these reactions lies in the later carrying out of the steam stripping operation, which is necessary to eliminate the polymerization solvent.

In fact, generally, experience shows that the functionalized polymers obtained undergo changes in macrostructure during this stripping operation, which results in serious degradation of their properties, unless one is limited to using as functionalizing agent an alkoxysilane belonging to a restricted family, such as that described in the aforementioned document U.S. Pat. No. 5,066,721.

Consequently, it emerges from the above that the use of diene polymers comprising an alkoxysilane function to obtain rubber compositions comprising silica as reinforcing filler is not satisfactory, despite the improved physical properties of these compositions.

This is why research has been carried out on other functionalization reactions, always with a view to obtaining such rubber compositions.

By way of example, mention may be made of French Patent Specification FR-A-2,740,778 in the name of Michelin, which discloses the incorporation, in rubber compositions comprising as reinforcing filler silica in a majority proportion (for example comprising a blend of silica and carbon black), of diene polymers bearing at the chain end a silanol function or a polysiloxane block having a silanol end. For example, a functionalizing agent consisting of a cyclic polysiloxane is used, such as hexamethylcyclotrisiloxane. The functionalized polymers obtained can be separated from the reaction medium resulting in their formation by steam extraction of the solvent, without their macrostructure and, consequently, their physical properties, changing.

Mention may also be made of European Patent Specification EP-A-877 047, which discloses the incorporation of such polymers having a silanol function in rubber compositions comprising as reinforcing filler carbon black having silica fixed to its surface.

It has been possible to establish that these polymers impart rubber properties, in particular hysteresis and reinforcement properties in the vulcanized state, which are improved compared with those of control compositions based on non-functionalized diene polymers, and which are at least analogous to those of compositions based on diene polymers comprising an alkoxysilane function.

Mention may also be made of European Patent Specification EP-A-692 493, which establishes that diene polymers bearing at the chain end alkoxysilane groups and an epoxy group result in improved reinforcement properties and in reduced hysteresis losses at small and large deformations.

One disadvantage of these polymers, which comprise a functional group which is active for coupling to silica or to carbon black surface-modified by silica, is that the improvement in the hysteresis and reinforcement properties which they impart to the rubber compositions incorporating them is generally accompanied by a processing ability of the non-vulcanized mixes which is compromised relative to that of non-functionalized "control" polymers.

Of the other functionalization reactions studied, mention may also be made of the functionalization of diene polymers by carboxylic acid functions (COOH) at the chain end, which is conventionally effected starting with an initiator containing an alkali metal.

This functionalization reaction may for example consist, as described in the article "Macromolecules, vol. 22, p. 85 (1989)", of reacting the solution of living polymer with carbon dioxide ($CO_2$) in the solid state, at a temperature of the order of −78° C.

Said reaction may also consist, as described in U.S. Pat. No. 4,950,721 and WO-A-91/04993, in first reacting the carbon-metal chain end or ends with a deactivating agent, such as 1,1-diphenylethylene or alternatively α-methylstyrene, then effecting the carbonation in the presence of a polar compound (for example tetrahydrofuran) which is present in the reaction medium in a mass fraction of from 2 to 25%, at a temperature not exceeding 20° C. (conventionally of −10° C.).

British Patent Specification GB-A-921 803 discloses carrying out the carbonation reaction of the living polymer in a zone of turbulence, for example in a T-shaped tube, into which zone a solution of living polymer and carbon dioxide are introduced.

There are also known from East German Patent Specifications DD-A-139 661 and DD-A-236 537 processes for the carbonation of living polymers which essentially consist of spraying a living polymer, for example a lithiated one, into a turbulent current of carbon dioxide characterized by a very high pressure and flow rate.

Japanese Patent Specifications JP-A-07/138 411 and JP-A-07/138 412 both disclose tire treads obtained by the association with carbon black of an elastomeric matrix comprising in a minority quantity a diene polymer comprising a COOH group at the chain end and having been functionalized by reaction with $CO_2$.

U.S. Pat. No. 3,900,532 discloses the association with silica of an elastomeric matrix comprising in a minority quantity a diene polymer comprising a COOH group at the chain end, with the aim of obtaining a pasty composition which may be, on one hand, processed by injection-moulding and, on the other hand, vulcanized without addition of sulphur or of vulcanization accelerator. To this end, this elastomeric matrix also comprises, in a majority quantity, another diene polymer which is not functionalized.

According to the example of embodiment illustrated in this document, the functionalized diene polymer is a polybutadiene, whereas the other non-functionalized diene polymer is a polychloroprene. Furthermore, the functionalized polybutadiene is present in the rubber composition in a quantity of 50 parts by weight per 100 parts of polychloroprene.

It will be noted that this polybutadiene is characterized by a molecular weight of 6,000 g/mol, this very low weight being linked to the high amount by weight of COOH functions, which is close to 2%.

Japanese Patent Specification JP-A-07/292 159 also discloses a cross-linkable rubber composition which comprises silica and an elastomeric matrix comprising in a very minority quantity a diene polymer comprising a COOH group at the chain end. This elastomeric matrix comprises in a majority proportion another diene polymer which is not functionalized, which is formed of natural rubber or of a copolymer of styrene and butadiene in the examples of embodiment quoted in this document. In these examples, the functionalized polymer is present in the rubber composition in a quantity of 5 parts by weight per 95 parts of non-functionalized polymer.

In the manner of the preceding document, it will be noted that the functionalized polymers which were tested are characterized by molecular weights which are at most equal to 38,000 g/mol, these low weights being linked to the high amounts by weight of COOH functions, which are close to 1%.

SUMMARY OF THE INVENTION

The present invention relates to a cross-linkable or cross-linked rubber composition having improved hysteresis properties in the cross-linked state which is useful for constituting a tire tread.

A rubber composition according to the invention is based on: an elastomeric matrix comprising at least one diene elastomer which comprises a carboxylic acid function at one or at each of its two chain ends, and a reinforcing filler comprising a reinforcing inorganic filler, and it is such that said diene elastomer has a molecular weight which is greater than 80,000 g/mol, and in that it is present in a majority quantity in said elastomeric matrix.

The subject of the invention also relates to a process for the preparation of a cross-linkable or cross-linked rubber composition having improved hysteresis properties in the cross-linked state.

The subject of the invention is also tires and, in particular tire treads, comprising a rubber composition according to the invention, to achieve reduced rolling resistance.

DETAILED DESCRIPTION OF THE INVENTION

Figure 1:
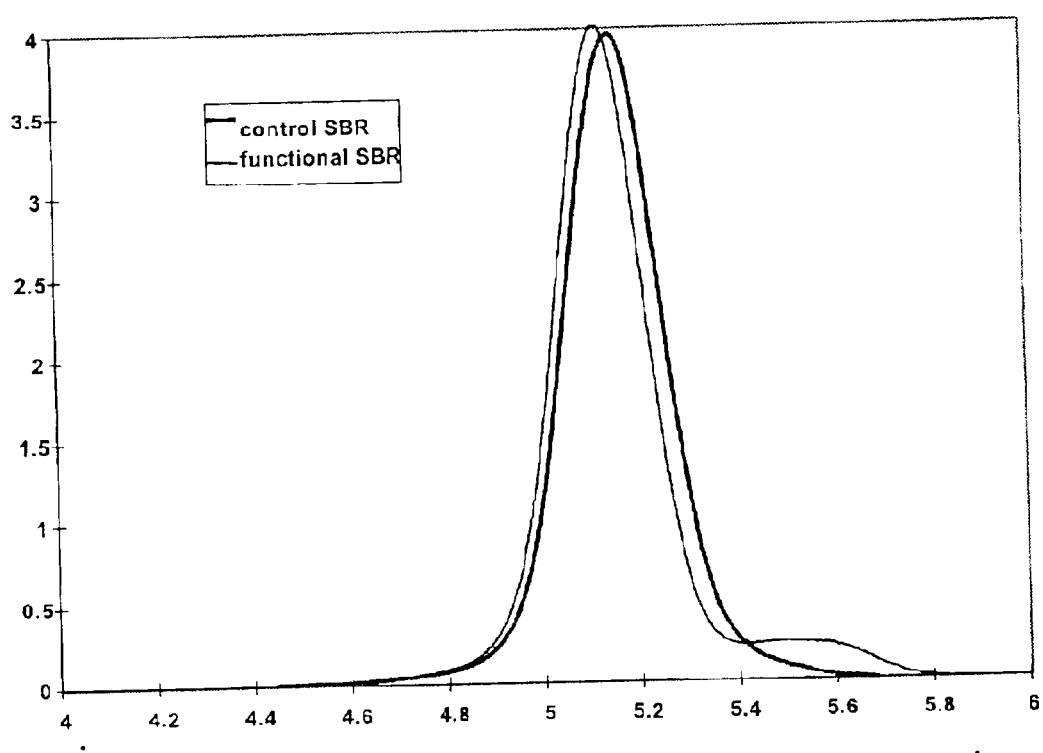
FIG. 1 shows a comparison of the molecular weights of SBR C (functional SBR) and control SBR using size exclusion chromatography (SEC).

The Inventors have unexpectedly discovered that a cross-linkable or cross-linked rubber composition obtained by the association with a reinforcing inorganic filler of an elastomeric matrix comprising at least one diene elastomer which comprises a carboxylic acid function at one or at each of its two chain ends, said diene elastomer having a molecular weight which is greater than 80,000 g/mol and being present in a majority quantity in said elastomeric matrix, has reduced hysteresis losses at small and large deformations, which are similar to those of known compositions based on polymers comprising functional groups which are active for coupling to silica (such as the alkoxysilane or silanol groups mentioned above), while having processing properties in the non-vulcanized state which are improved compared with those of these known compositions filled with silica and which are comparable to those of compositions filled with silica based on non-functionalized polymers.

These advantageous characteristics make the composition according to the invention usable to constitute a tire tread.

Diene elastomer is understood to mean, in known manner, an elastomer (homopolymer or copolymer) which has resulted at least in part from diene monomers (monomers bearing two double carbon-carbon bonds, whether conjugated or not).

Preferably, said diene elastomer having carboxylic acid function(s) of the composition according to the invention is an "essentially unsaturated" diene elastomer, that is to say, a diene elastomer which has resulted at least in part from conjugated diene monomers having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, because they may be described as "essentially saturated" diene elastomers (low or very low content of units of diene origin which is always less than 15%).

Even more preferably, said diene elastomer having carboxylic acid function(s) of the composition according to the invention is a "highly unsaturated" diene elastomer, that is to say, a diene elastomer having a content of units of diene origin (conjugated dienes) which is greater than 50%.

The following may be used as diene elastomer capable of being used in the compositions according to the invention:

a homopolymer obtained by polymerization of a conjugated diene monomer having 4 to 12 carbon atoms, or a copolymer obtained by copolymerization of one or more dienes conjugated together or with one or more vinyl-aromatic compounds having 8 to 20 carbon atoms.

Suitable conjugated dienes are, in particular, 1,3-butadiene, 2-methyl-1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution. They may be coupled and/or starred or alternatively functionalized with a coupling and/or starring or functionalizing agent.

Preferred are polybutadienes, and in particular those having a content of 1,2-units of between 4% and 80%, or those having a content of cis-1,4 [bonds] of more than 80%, synthetic polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight and a glass transition temperature (Tg) of between −40° C. and −80° C., isoprene-styrene copolymers and in particular those having a styrene content of between 5% and 50% by weight and a Tg of between −25° C. and −50° C.

In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

Particularly preferably, the diene elastomer of the composition according to the invention is selected from the group of highly unsaturated diene elastomers consisting of polybutadienes (BR), synthetic polyisoprenes (IR), butadiene-styrene copolymers (SBR), butadiene-isoprene copolymers (BIR), isoprene-styrene copolymers (SIR), butadiene-styrene-isoprene copolymers (SBIR), and mixtures of two or more of these compounds.

Even more preferably, the diene elastomer is a butadiene-styrene copolymer prepared in solution having a styrene content of between 20% and 30% by weight, a content of vinyl bonds of the butadiene fraction of between 15% and 65%, a content of trans-1,4 bonds of between 15% and 75% and a Tg of between −20° C. and −55° C., or alternatively a butadiene-styrene-isoprene copolymer.

There are considered in the invention the aforementioned diene elastomers which are obtained from any anionic initiator, whether it be monofunctional or polyfunctional, or non-anionic initiator. However, preferably an anionic initiator containing an alkali metal such as lithium, or an alkaline-earth metal such as barium, is used.

Suitable organolithium initiators are in particular those comprising one or more carbon-lithium bonds. Mention may be made, for example, of aliphatic organolithiums, such as ethyllithium, n-butyllithium (nBuLi), isobutyllithium, and dilithium polymethylenes such as 1,4-dilithiobutane.

It is also advantageously possible to use lithium amides, because they result in a polymer which may have a tertiary amine function at one of the chain ends and a COOH function at the other end. These lithium amides are obtained from an acyclic or cyclic secondary amine, such as pyrrolidine or hexamethyleneimine.

Also considered in the invention are diene elastomers which are initiated by compounds of transition metals, such as compounds of titanium for example, or by rare earths, such as neodymium.

The polymerization, as is known to the person skilled in the art, is preferably effected in the presence of an inert solvent which may for example be an aliphatic or alicyclic hydrocarbon such as pentane, hexane, iso-octane, cyclohexane, methylcyclohexane or cyclopentane, or an aromatic hydrocarbon such as benzene, toluene or xylene. This polymerization may be effected continuously or discontinuously. It is generally effected at a temperature of between 20° C. and 120° C., preferably between 30° C. and 100° C.

The functionalization of the diene elastomers thus obtained by COOH functions at the chain end may for example be effected using one of the processes mentioned above on page 3, line 25 to page 4, line 13 of the present description (i.e. by referring to any one of the aforementioned documents "Macromolecules, vol. 22, p. 85 (1989)", U.S. Pat. No. 4,950,721, WO-A-91/04993, GB-A-921 803, DD-A-139 661 and DD-A-236 537.

Advantageously, this functionalization is effected using the carbonation process described in European Patent Specification EP-A-1 072 613 in the name of Michelin, the contents of which are incorporated in the present description by reference.

Of course, the compositions of the invention may contain a single diene elastomer such as the aforementioned one or a mixture of several of these diene elastomers.

The diene elastomer(s) according to the invention having COOH function(s) may be used on their own in the composition according to the invention, or be used in a blend with any other elastomer conventionally used in tires, such as natural rubber or a blend based on natural rubber and a synthetic elastomer, or alternatively another diene elastomer which may possibly be coupled and/or starred or alternatively partially or entirely functionalized with a function other than a carboxylic acid function.

It will be noted that the improvement in the properties of the rubber composition according to the invention will be all the greater, the lower the proportion of said conventional elastomer(s) in the composition according to the invention. Advantageously, this or these conventional elastomer(s) may if applicable be present in the composition according to the invention in a quantity of from 1 to 70 parts by weight per 100 parts by weight of diene elastomer(s) according to the invention having carboxylic acid function(s).

In the present application, "reinforcing inorganic filler", in known manner, is understood to mean an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

Preferably, the reinforcing inorganic filler is present in the composition of the invention in a quantity equal to or greater than 40 phr (phr=parts by weight per hundred parts of diene elastomer(s)).

Also preferably, this reinforcing inorganic filler is present in a majority proportion in the reinforcing filler of the composition of the invention, such that its mass fraction in said reinforcing filler is greater than 50%.

Advantageously, the entirety or at the very least a majority proportion of said reinforcing inorganic filler is silica ($SiO_2$). The silica used may be any reinforcing silica known to the person skilled in the art, in particular any precipitated or pyrogenic silica having a BET surface area and a specific CTAB surface area both of which are less than 450 $m^2/g$, even if the highly dispersible precipitated silicas are preferred.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV 3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in application EP-A-0 735 088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

It will be noted that the reinforcing filler of a rubber composition according to the invention may contain in a blend (mixture), in addition to the aforementioned reinforcing inorganic filler or fillers, carbon black in a minority proportion (that is to say, in a mass fraction of less than 50%). Suitable carbon blacks are any carbon blacks, in particular the blacks of the type HAF, ISAF and SAF, which are conventionally used in tires, and particularly in tire treads. As non-limitative examples of such blacks, mention may be made of the blacks N115, N134, N234, N339, N347 and N375.

For example, black/silica blends or blacks partially or entirely covered with silica are suitable to form the reinforcing filler. Also suitable are reinforcing inorganic fillers comprising carbon blacks modified by silica such as, and this is non-limitative, the fillers sold by CABOT under the name "CRX 2000", which are described in International Patent Specification WO-A-96/37547.

As reinforcing inorganic filler, there may also be used, in non-limitative manner, aluminas (of formula $Al_2O_3$), such as the aluminas of high dispersibility which are described in European Patent Specification EP-A-810 258, or alternatively aluminium hydroxides, such as those described in International Patent Specification WO-A-99/28376.

In the event that the reinforcing filler contains only a reinforcing inorganic filler and carbon black, the mass fraction of this carbon black in said reinforcing filler is preferably selected to be less than or equal to 30%.

However, experience shows that the aforementioned properties of the composition according to the invention are improved all the more, the higher the mass fraction of reinforcing inorganic filler contained in the reinforcing filler which the composition comprises, and that said properties are optimum when said composition contains solely a reinforcing inorganic filler, for example silica, as reinforcing filler. This latter case therefore constitutes a preferred example of a rubber composition according to the invention.

The rubber composition according to the invention furthermore comprises, in conventional manner, a reinforcing inorganic filler/elastomeric matrix bonding agent (also referred to as coupling agent), the function of which is to ensure sufficient chemical and/or physical bonding (or coupling) between said inorganic filler and the matrix, while facilitating the dispersion of this inorganic filler within said matrix.

"Coupling agent" is more precisely understood to mean an agent capable of establishing a sufficient chemical and/or physical connection between the filler in question and the elastomer, while facilitating the dispersion of this filler within the elastomeric matrix. Such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulphur atom;

T represents a group linking Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any known coupling agent known to or likely to ensure, in the diene rubber compositions which can be used for the manufacture of tires, the effective bonding or coupling between a reinforcing inorganic filler such as silica and a diene elastomer, such as, for example, organosilanes, in particular polysulphurized alkoxysilanes or mercaptosilanes, or alternatively polyorganosiloxanes bearing the X and Y functions mentioned above, may be used.

Silica/elastomer coupling agents in particular have been described in a large number of documents, the best known being bifunctional alkoxysilanes such as polysulphurized alkoxysilanes.

In particular polysulphurized alkoxysilanes, which are referred to as "symmetrical" or "asymmetrical" depending on their specific structure, are used, such as those described for example in U.S. Pat. Nos. 3,842,111; 3,873,489; 3,978,103; 3,997,581; 4,002,594; 4,072,701; 4,129,585; 5,580,919; 5,583,245; 5,650,457; 5,663,358; 5,663,395; 5,663,396; 5,674,932; 5,675,014; 5,684,171; 5,684,172; 5,696,197; 5,708,053; 5,892,085; and EP-A-1,043,357, which describe such known compounds in detail.

Particularly suitable for implementing the invention, without the definition below being limitative, are symmetrical polysulphurized alkoxysilanes which satisfy the following general formula (I):

Z—A—S$_n$—A—Z, in which: (I)

n is an integer from 2 to 8 (preferably from 2 to 5);

A is a divalent hydrocarbon radical (preferably C$_1$-C$_{18}$ alkylene groups or C$_6$-C$_{12}$ arylene groups, more particularly C$_1$-C$_{10}$ alkylenes, in particular C$_1$-C$_4$ alkylenes, in particular propylene);

Z corresponds to one of the formulae below:

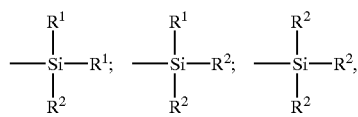

in which:
the radicals R$^1$, which may or may not be substituted, and may be identical or different, represent a C$_1$-C$_{18}$ alkyl group, a C$_5$-C$_{18}$ cycloalkyl group or a C$_6$-C$_{18}$ aryl group, (preferably C$_1$-C$_6$ alkyl groups, cyclohexyl or phenyl, in particular C$_1$-C$_4$ alkyl groups, more particularly methyl and/or ethyl).

the radicals R$^2$, which may or may not be substituted, and may be identical or different, represent a C$_1$-C$_{18}$ alkoxyl group or a C$_5$-C$_{18}$ cycloalkoxyl group (preferably C$_1$-C$_8$ alkoxyl groups or C$_5$-C$_8$ cycloalkoxyl groups, more preferably C$_1$-C$_4$ alkoxyl groups, in particular methoxyl and/or ethoxyl).

In the case of a mixture of polysulphurized alkoxysilanes in accordance with Formula (I) above, in particular conventional, commercially available, mixtures, it will be understood that the average value of the "n"s is a fractional number, preferably within a range from 2 to 5.

As polysulphurized alkoxysilanes, mention will be made more particularly of the polysulphides (in particular disulphides, trisulphides or tetrasulphides) of bis-(alkoxyl (C$_1$-C$_4$)-alkyl(C$_1$-C$_4$)silylalkyl(C$_1$-C$_4$)), such as for example the polysulphides of bis(3-trimethoxysilylpropyl) or of bis(3-triethoxysilylpropyl). Of these compounds, preferably bis(3-triethoxysilylpropyl) tetrasulphide, abbreviated TESPT, of the formula [(C$_2$H$_5$O)$_3$Si(CH$_2$)$_3$S$_2$]$_2$, or bis (triethoxysilylpropyl) disulphide, abbreviated TESPD, of the formula [(C$_2$H$_5$O)$_3$Si(CH$_2$)$_3$S]$_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

The compositions according to the invention also comprise, in addition to the diene elastomers having carboxylic acid function(s) and said reinforcing inorganic filler, plasticisers, pigments, antioxidants, anti-ozone waxes, a vulcanization system based either on sulphur and/or on peroxide and/or on bismaleimides, vulcanization accelerators, extender oils, one or more agents for covering the reinforcing inorganic filler, such as alkoxysilanes, polyols or amines.

Another subject of the invention is a process for the preparation of a cross-linkable rubber composition according to the invention.

In known manner, such a process consists essentially in a first phase of thermomechanical working of the constituents of said composition with the exception of the cross-linking system and at a maximum temperature of between 130° C. and 200° C., followed by a second phase of mechanical working effected at a temperature less than that of said first phase and during which said cross-linking system is incorporated, said first phase comprising:

a first step in which said constituents of said first phase, with the exception of the antioxidant, are mixed together, and a second step in which the antioxidant is incorporated and mixed with the constituents of said first step.

Furthermore, zinc monoxide is conventionally added during said second step to activate the later cross-linking.

The Applicant unexpectedly discovered that incorporating all the zinc monoxide during the first step of thermomechanical working, contrary to the convention in which it is incorporated during the second step of thermomechanical working, makes it possible to minimize further the hysteresis losses at low deformations of the composition according to the invention in the cross-linked state which corresponds to the above definition, while imparting to this composition according to the invention processing properties in the non-cross-linked state which are still improved compared with those of compositions based on known functional elastomers and which are comparable to those of the compositions according to the invention obtained by incorporation of zinc monoxide during the second step of thermomechanical working.

Another subject of the invention is a tread for a tire, which is such that it comprises a rubber composition such as that mentioned above, or alternatively which is such that it is formed of this composition.

Owing to the reduced hysteresis which characterizes a rubber composition according to the invention in the vulcanized state, it will be noted that a tire, the tread of which comprises said composition, has an advantageously reduced rolling resistance.

A tire according to the invention is such that it comprises this tread.

EXAMPLES

The aforementioned characteristics of the present invention, as well as others, will be better understood on reading the following description of several examples of embodiment of the invention, which are given by way of illustration and not of limitation.

For the polymers, the viscosities indicated are inherent viscosities which are measured at a concentration of 1 g/l in toluene at 25° C.

The following experimental techniques were in particular used for characterizing the polymers obtained.

a) The SEC technique (size exclusion chromatography) was used to determine the distributions of molecular weights relative to samples of these polymers. Starting from standard products whose characteristics are described in Example 1 of European Patent Specification EP-A-692 493, this technique made it possible to evaluate, for a sample, a number-average molecular weight which has a relative value, unlike the one determined by osmometry, and also a weight-average molecular weight (Mw). The polydispersity index (Ip=Mw/Mn) of this sample was deduced therefrom.

According to this technique, the macromolecules are separated physically according to their respective sizes when swollen, in columns filled with a porous stationary phase. Before implementing this separation, the sample of polymer is solubilized at a concentration of about 1 g/l in tetrahydrofuran.

A chromatograph sold under the name "WATERS" and under the model "150C" is used for the aforementioned separation. The elution solvent is tetrahydrofuran, the flow rate is 1 ml/min, the temperature of the system is 35° C. and the duration of analysis is 30 in. A set of two "WATERS" columns is used, the type being "STYRAGEL HT6E".

The injected volume of the solution of polymer sample is 100 μl. The detector is a "WATERS" differential refractometer, the model number of which is "R401". Software for processing the chromatographic data is also used, the trade name of which is "WATERS MILLENIUM".

b) With the aim of calculating the amount of COOH functions (in meq/kg of polymer) and the number of corresponding functional units, a metering method using the $^1$H NMR technique was used, after esterification with an excess of diazomethane, which reagent is known to react with COOH functions.

More precisely, this method consists of obtaining, using diazomethane, methyl ester functions from the COOH functions which have been fixed to the elastomer, in order to provide access indirectly and quantitatively to the amounts of COOH functions by $^1$H NMR.

(i) First, the diazomethane is prepared as follows:
It is obtained by action of alcoholic potassium hydroxide solution on N-methyl-N-nitrosoparatoluenesulphonamide, in the presence of diethyl ether at the temperature of melting ice. Then the ether phase containing the reagent is recovered by simple distillation.

The esterification reaction is then carried out in the following manner.

(ii) A sample of the elastomer which has been washed and dried in specific manner is solubilized in toluene, so as to be able to characterize it by analysis.

(iii) This specific preparation consists of treating the elastomer by three successive dissolution operations in toluene, respectively followed by coagulation operations in a mixture formed of acetone and water which is acidified to pH=2 with hydrochloric acid, in order to eliminate any traces of acidic compounds (stopper, antioxidant, catalytic residues, by-products such as isovaleric acid, in particular). Then the elastomer thus treated is dried in an oven at 50° C., in a vacuum and under a nitrogen atmosphere.

(iv) Then the ethereal solution containing the diazomethane is added thereto, such that there is an excess of reagent relative to the COOH functions. The polymer thus treated is subsequently coagulated in methanol, then redissolved twice in toluene and methanol to coagulate it. The polymer is then dried in a desiccator at ambient temperature and under a high vacuum by means of a vane pump.

(v) $^1$H NMR analysis is then performed in the following manner.

A sample of the polymer esterified in this way is solubilized in carbon disulphide. The $^1$H NMR signal is analysed using a spectrometer marketed under the name BRUKER AC200. The characteristic signal of the three methyl protons of $COOCH_3$ provides quantitative access to the initial amount of COOH functions in the functional polymer.

In the following examples, the properties of the compositions of the invention are evaluated as follows:

Mooney viscosity ML (1+4) at 100° C., measured in accordance with ASTM Standard D-1646, referred to as Mooney in the tables, Moduli of elongation at 300% (ME 300), at 100% (ME 100) and at 10% (ME 10):
measurements taken in accordance with Standard ASTM 412,
Scott break indices: measured at 20° C.
Breaking load (BL) measured in MPa,
Elongation at break (EB) in %, Hysteresis losses (HL): measured by rebound at 60° C. in %. The deformation for the losses measured is 40%.

Shore A hardness: measurements taken in accordance with Standard ASTM 2240,
Dynamic shear properties:
Measurements as a function of the deformation: performed at 10 Hertz with a peak-to-peak deformation of from 0.15% to 50%. The non-linearity expressed is the difference in the shear modulus between 0.15% and 50% deformation, in MPa. The hysteresis is expressed by the measurement of tan δ max. at 23° C. in accordance with Standard ASTM D2231-71 (reapproved in 1977).

EXAMPLE I

Preparation of Styrene/Butadiene Copolymers (SBR), Whether Functionalized or not at the Chain End A. Discontinuous Preparation of a Non-Functional Styrene/Butadiene Copolymer (SBR A)

In a first phase, a styrene/butadiene copolymer is prepared by injecting 167 g of styrene, 476 g of butadiene and 2000 ppm of tetrahydrofuran (THF) into a 10 liter reactor containing 6.4 liters of deaerated heptane. The impurities are neutralized using n-BuLi, then 0.0038 mol of n-BuLi and 0.0011 mol of sodium tert. butylate used as randomizing agent are added. The polymerization is carried out at 55° C.

In a second phase, at 90% conversion, 0.006 mol of methanol is injected into the reactor. The polymer solution is stirred for 15 minutes at 55° C. The polymer is antioxidized by the addition of 0.8 phr 2,2'-methylene bis(4-methyl-6-tert. butylphenol) and 0.2 phr N-(1,3-dimethylbutyl)-N'-p-phenylenediamine, then recovered by steam stripping and dried on an open mill at 100° C.

The SBR A thus obtained has the following characteristics:

| Incorporated styrene | 26% by weight |
|---|---|
| Number of vinyl units of the butadiene fraction | 41% |
| Viscosity measured in toluene at 25° C. (dl/g) | 1.4 |
| Mooney viscosity ML (1 + 4, 100° C.) | 26 |
| Mn measured by osmometry | 155,000 g/mol. |
| polydispersity index | 1.07. |

B. Discontinuous Preparation of a Styrene/Butadiene Copolymer (SBR B) Functionalized by Reaction with Hexamethylcyclotrisiloxane In a first phase, operation is under conditions identical to those described for the preparation of SBR A.

In a second phase, at 90% conversion, an aliquot part is taken from the reactor, the reaction is stopped by adding methanol and the viscosity of the polymer is measured, it being 1.4 dl/g. 0.0013 mol of hexamethylcyclotrisiloxane (D3) is injected into the rest of the contents of the reactor. The polymer solution is stirred for 15 minutes at 55° C. The polymer is antioxidized by the addition of 0.8 phr 2,2'-methylene bis(4-methyl-6-tert. butylphenol) and 0.2 phr N-(1,3-dimethylbutyl)-N'-p-phenylenediamine, then recovered by steam stripping and dried on an open mill at 100° C.

The SBR B thus obtained has the following characteristics:

| Incorporated styrene | 26% by weight |
|---|---|
| Number of vinyl units of the butadiene fraction | 41% |
| Viscosity measured in toluene at 25° C. (dl/g) | 1.4 |
| Mooney viscosity ML (1 + 4, 100° C.) | 26 |
| Mn measured by osmometry | 155,000 g/mol. |
| Polydispersity index | 1.07. |

The amount of functionalized chains is measured by $^1$H NMR, after purification of the polymer sample by a series of three coagulation operations in methanol, redissolving in toluene. This amount of functionalized chains is expressed by means of this technique in milli-equivalents per kilogramme of polymer (meq/kg). The $^1$H NMR spectrum is characterized by blocks at 0 and −0.1 ppm corresponding to the —Si(CH$_3$)$_2$—OH group. For the SBR B, $^1$H NMR analysis provides an amount of functions of 4.5 meq/kg which, taking into account the molecular weight Mn of the polymer, corresponds to approximately 70% of functionalized chains.

C. Discontinuous Preparation of a Styrene/Butadiene Copolymer (SBR C) Comprising a COOH Function at One of its Chain Ends by Reaction with Carbon Dioxide In a first phase, a styrene/butadiene copolymer is prepared by injecting 113 g of styrene, 323 g of butadiene and 500 ppm of tetrahydrofuran (THF) into a 10 liter reactor containing 6.4 liters of deaerated heptane. The impurities are neutralized using n-BuLi, then 0.0026 mol of n-BuLi and 0.0008 mol of sodium tert. butylate used as randomizing agent are added. The polymerization is carried out at 50° C.

In a second phase, after total conversion of the monomers, an aliquot part is taken from the reactor, which is subjected to stopping by adding oxalic acid, and the viscosity of the polymer is measured, it being 1.4 dl/g. The rest of the solution is cooled to −10° C. then the carbon dioxide is introduced at a pressure of 3 bars, several times until the pressure stabilizes. The polymer is then neutralized by addition of 0.006 mol oxalic acid. During the neutralization phase, the temperature of the reaction medium is allowed to rise again. The polymer solution is stirred for 15 minutes. The polymer is antioxidized by the addition of 0.8 phr 2,2'-methylene bis(4-methyl-6-tert. butylphenol) and 0.2 phr N-(1,3-dimethylbutyl)-N'-p-phenylenediamine, then recovered by steam stripping and dried on an open mill at 100° C.

The SBR C thus obtained has the following characteristics:

| Incorporated styrene | 27% by weight |
|---|---|
| Number of vinyl units of the butadiene fraction | 39% |
| Viscosity measured in toluene at 25° C. (dl/g) | 1.5 |
| Mooney viscosity ML (1 + 4, 100° C.) | 28 |
| Mn measured by osmometry | 160,000 g/mol. |

An attempt was made to characterize, by the aforementioned SEC technique, the solution of polymer having reacted with the carbon dioxide (referred to as "functional SBR"), in comparison with a sample taken before introduction of the carbon dioxide and protonated by addition of methanol (referred to as "Control SBR").

As shown in FIG. 1 which represents the respective characteristics of said "functional SBR" and said "control SBR", the functionalization did not modify the distribution of the molecular weights significantly.

The amount of COOH functions at the chain end is measured by metering in accordance with the $^1$H NMR technique described in paragraph b) above, and it is equal to 4.5 meq/kg which, taking into account the molecular weight Mn of the elastomer, corresponds to an amount of COOH functions at the chain end of about 80%.

D. Discontinuous Preparation of Two Styrene/Butadiene Copolymers (SBR D and SBR E) Each Comprising a COOH Function at Each Chain End, by Reaction with Carbon Dioxide In this example, the polymerization initiator is the dilithiated compound 1,2-dilithio-1,1,4,4-tetraphenylbutane (DLTB), the content of carbon-lithium bonds of which is determined by Gilman dosing (J. Am. Chem. Soc. 66, 1515, 1944).

Synthesis of a Copolymer SBR D of a Molecular Weight of 165,000 g/mol

In a first phase, a styrene/butadiene copolymer is prepared by injecting 113 g of styrene and 323 g of butadiene into a 10 liter reactor containing 1.1 liters of methylcyclohexane and 4.5 liters of cyclohexane. The impurities are neutralized using n-BuLi, then there is added 46 ml of a 0.113 M solution of DLTB (or 0.0052 mol of C-Li bonds) in a cyclohexane 70/ethyl ether 30 mixture (volume/volume), and also 0.00078 mol of sodium tert. butylate used as randomizing agent. The polymerization is carried out at 50° C.

After total conversion of the monomers, an aliquot part is taken from the reactor, the reaction is stopped by adding methanol and the viscosity of the polymer is measured, it being 1.4 dl/g. The rest of the solution is cooled to −10° C., then there is added 2.8 liters of tetrahydrofuran which has been distilled beforehand and then treated with n-butyllithium, in order to neutralize the residual impurities. Then the carbon dioxide is introduced at a pressure of 3 bars, several times until the pressure stabilizes. The polymer is then neutralized by addition of 0.012 mol oxalic acid.

During the neutralization phase, the temperature of the reaction medium is allowed to rise again. The polymer solution is stirred for 15 minutes. The polymer is antioxidized by the addition of 0.8 phr 2,2'-methylene bis(4-methyl-6-tert. butylphenol) and 0.2 phr N-(1,3-dimethylbutyl)-N'-p-phenylenediamine, then recovered by steam stripping and dried on an open mill at 100° C.

The SBR D thus obtained has the following characteristics:

| | |
|---|---|
| Incorporated styrene | 27% by weight |
| Number of vinyl units of the butadiene fraction | 39% |
| Viscosity measured in toluene at 25° C. (dl/g) | 1.42 |
| Mooney viscosity ML (1 + 4, 100° C.) | 28 |
| Mn measured by osmometry | 165,000 g/mol. |

Figure 2:
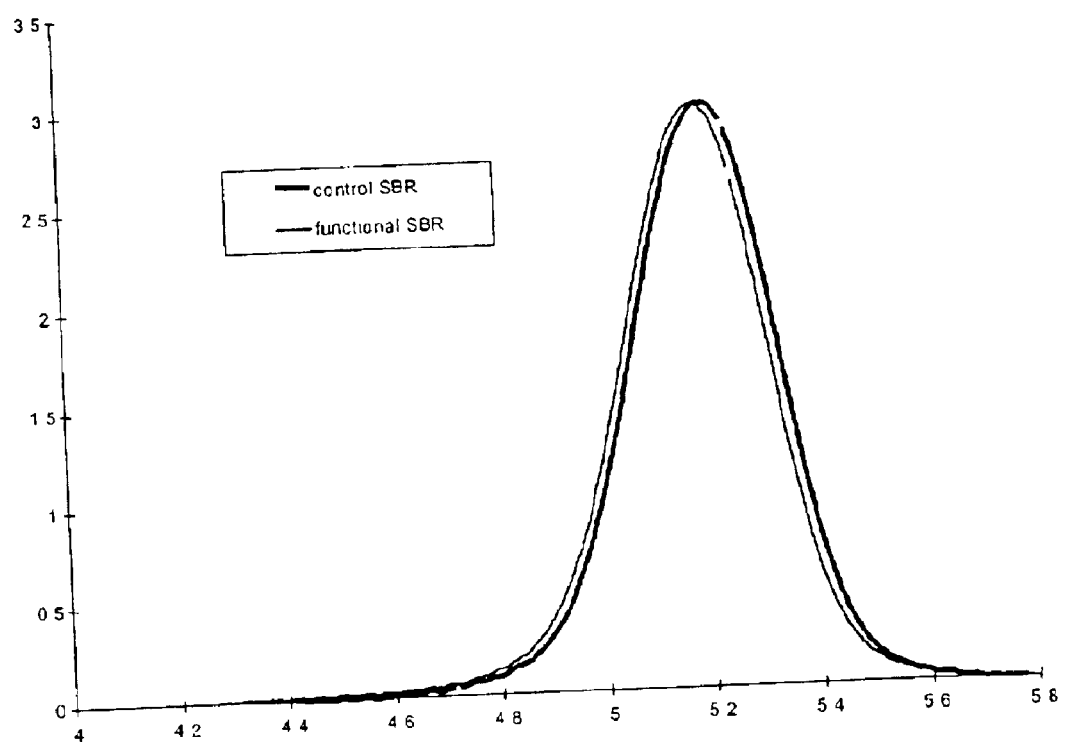
FIG. 2 shows comparison of the molecular weights of SBR D (functional SBR) and control SBR using size exclusion chromatography (SEC).

As previously, the SEC analysis shown in FIG. 2 shows that the functionalization did not induce any modification of the distribution of the molecular weights.

$^1$H NMR analysis, effected as indicated previously, yields an amount of functions of 6.1 meq/kg which, taking into account the molecular weight Mn of the polymer, corresponds to an amount of COOH functions at the chain ends of approximately 50%.

Synthesis of a Copolymer SBR E of a Molecular Weight of 90,000 g/mol

In the same manner the SBR E was synthesised, which has a microstructure identical to that of the SBR D. $^1$H NMR analysis yields an amount of functions of 13 meq/kg which, taking into account the molecular weight Mn of the polymer, corresponds to an amount of COOH functions at the chain ends of approximately 60%.

EXAMPLE II

Rubber Compositions Comprising a Reinforcing Inorganic Filler and the Aforementioned Elastomers A. Compositions the Reinforcing Filler of Which is Formed of Silica 1) Use of SBR C (Comprising a COOH Function at one Chain End)

In this example, three elastomers of section I (SBR A, SBR B, SBR C) were used for the preparation of four rubber compositions A, B, C and C' of the passenger-car-tread type.

More precisely, compositions A and B are respectively based on the elastomers SBR A and SBR B, whereas compositions C and C' are each based on the elastomer SBR C.

Each of these compositions A, B, C and C' has the following formulation (expressed in phr=parts by weight per hundred parts of elastomer):

| | |
|---|---|
| Elastomer | 100 |
| Silica (1) | 80 |
| Aromatic oil ("ENERFLEX 65") | 40 |
| Bonding agent (2) | 6.4 |
| ZnO | 2.5 |
| Stearic acid | 1.5 |
| Antioxidant (3) | 1.9 |
| Anti-ozone wax "C32ST" | 1.5 |
| Sulphur | 1.1 |
| Sulphenamide (4) | 2 |
| Diphenylguanidine | 1.5 | with
(1) = silica "ZEOSIL 1165MP" from Rhodia,
(2) = bonding agent "Si69" from Degussa,
(3) = N-(1,3-dimethylbutyl)-N'-phenyl-p-phenylenediamine, and
(4) = N-cyclohexyl-2-benzothiazylsulphenamide.

Each of the compositions A, B, C and C' is produced, in a first phase of thermomechanical working, by two steps separated by a cooling phase, then, in a second, finishing, phase, by mechanical working.

There are introduced in succession into a laboratory internal mixer of the "Banbury" type, the capacity of which is 400 cm³, which is 70% filled and the initial temperature of which is approximately 90° C., the elastomer, two-thirds of the reinforcing filler, the coupling agent, the diphenylguanidine and the stearic acid, then, approximately one minute later, the rest of the reinforcing filler, the aromatic oil and the anti-ozone wax "C32ST", then, solely in order to obtain composition C', all of the zinc monoxide at 120° C.

The first thermomechanical working step is performed for 4 to 5 minutes, until a maximum dropping temperature of about 160° C. is achieved. The elastomeric block is then recovered and cooled.

Then a second step of thermomechanical working is performed in the same mixer for 3 to 4 minutes, with addition of the antioxidant and, for the other compositions A, B and C, with addition of all the zinc monoxide, until a maximum dropping temperature of about 160° C. is achieved.

The aforementioned first phase of thermomechanical working is thus effected, it being specified that the average speed of the blades during this first phase is 45 rpm.

The mixture thus obtained is recovered, is cooled and then, in an external mixer (homo-finisher), the sulphur and sulphenamide are added at 30° C., by mixing everything for 3 to 4 minutes (aforementioned second phase of mechanical working).

The compositions thus obtained are then calendered, either in the form of sheets (of a thickness of 2 to 3 mm) or of fine films of rubber in order to measure their physical or mechanical properties, or in the form of profiled elements which can be used directly, after cutting out and/or assembly to the dimensions desired, for example as semi-finished products for tires, in particular for treads.

The cross-linking is carried out at 150° C. for 40 min.

The results are set forth in Table 1 below.

TABLE 1

| COMPOSITION | A | B | C | C' |
|---|---|---|---|---|
| Elastomer | SBR A | SBR B | SBR C | SBR C |
| Mn SBR | 155000 | 155000 | 160000 | 160000 |
| ML (1 + 4) rubber at 100° C. | 26 | 26 | 28 | 28 |
| Properties in the non-vulcanized state | | | | |
| ML (1 + 4) at 100° C. (Mooney "mix"") | 45 | 92 | 48 | 52 |
| Properties in the vulcanized state | | | | |
| Shore | 66.5 | 58.1 | 63.9 | 62.7 |
| ME10 | 5.53 | 3.52 | 5.24 | 4.87 |
| ME100 | 1.83 | 1.69 | 1.73 | 1.55 |

TABLE 1-continued

| COMPOSITION | A | B | C | C' |
|---|---|---|---|---|
| ME300 | 2.09 | 2.31 | 2.10 | 1.92 |
| ME300/ME100 | 1.15 | 1.37 | 1.22 | 1.24 |
| Scott break index at 20° C. | | | | |
| BL | 18.9 | 23.4 | 19.8 | 23.0 |
| EB % | 575 | 533 | 555 | 696 |
| Losses at 60° C. (def. 40%) | 29.5 | 16.7 | 26.4 | 26.9 |
| Dynamic properties as a function of deformation | | | | |
| Delta G* at 23° C. | 4.21 | 0.78 | 3.15 | 1.89 |
| tan δ max at 23° C. | 0.335 | 0.186 | 0.287 | 0.244 |

As far as the properties in the vulcanized state are concerned, it will be noted, on one hand, that the ratio ME300/ME100 relating to compositions B, C, C' (based respectively on SBR B and SBR C) is greater than that relating to composition A and, on the other hand, that the hysteresis properties (at low and high deformations) are greatly improved compared with those of composition A.

It will also be noted that compositions C and C' according to the invention have values of Mooney "mix" which are distinctly less than that of composition B. These values are close to that of composition A. These Mooney values are indicative of a processing ability which is significantly improved compared to that of the compositions based on known functional elastomers.

Furthermore, composition C', which constitutes a preferred example of embodiment of the invention (with incorporation of all the zinc monoxide during the first step of the first phase of thermomechanical working), has hysteresis properties at low deformations which are improved compared with those of the other composition according to the invention C.

In other words, the elastomer SBR C, which comprises a COOH function at one of the chain ends, imparts to silica-filled compositions practically the same rubber properties as those imparted to a composition also filled with silica by an elastomer functionalized by reaction with hexamethylcyclotrisiloxane, but with a processing ability close to that imparted by a non-functional elastomer such as SBR A.

2) Use of SBR D and SBR E (Each Comprising COOH Functions at Both Ends of the Chain)

In this example, four elastomers of section I (SBR A, SBR B, SBR D and SBR E) were used for the preparation of rubber compositions of the passenger-car-tread type (A, B, D and E, respectively).

Each of these compositions has the following formulation (expressed in phr: parts by weight per hundred parts of elastomer):

| Elastomer | 100 |
|---|---|
| Silica (1) | 80 |
| Aromatic oil ("ENERFLEX 65") | 40 |
| Bonding agent (2) | 6.4 |
| ZnO | 2.5 |
| Stearic acid | 1.5 |
| Antioxidant (3) | 1.9 |
| Anti-ozone wax "C32ST" | 1.5 |
| Sulphur | 1.1 |
| Sulphenamide (4) | 2 |
| Diphenylguanidine | 1.5 | with
(1) = silica "ZEOSIL 1165MP" manufactured by Rhodia,
(2) = bonding agent "Si69" from Dégussa,
(3) = N-(1,3-dimethylbutyl)-N'-phenyl-p-phenylenediamine, and
(4) = N-cyclohexyl-2-benzothiazylsulphenamide.

Each of these compositions A, B, D and E is produced, in a first phase of thermomechanical working, by two steps separated by a cooling phase, then, in a second, finishing, phase, by mechanical working.

There are introduced in succession into a laboratory internal mixer of the "Banbury" type, the capacity of which is 400 cm$^3$, which is 70% filled and the initial temperature of which is approximately 90° C., the elastomer, two-thirds of the reinforcing filler, the coupling agent, the diphenylguanidine and the stearic acid, then, approximately one minute later, the rest of the reinforcing filler, the aromatic oil and the anti-ozone wax "C32ST".

The first thermomechanical working step is performed for 4 to 5 minutes, until a maximum dropping temperature of about 160° C. is achieved. The elastomeric block is then recovered and cooled.

Then a second step of thermomechanical working is performed in the same mixer for 3 to 4 minutes, with addition of the antioxidant and all the zinc monoxide, until a maximum dropping temperature of about 160° C. is achieved.

The aforementioned first phase of thermomechanical working is thus effected, it being specified that the average speed of the blades during this first phase is 45 rpm.

The mixture thus obtained is recovered, is cooled and then, in an external mixer (homo-finisher), the sulphur and sulphenamide are added at 30° C., by mixing everything for 3 to 4 minutes (aforementioned second phase of mechanical working).

The compositions thus obtained are then calendered as indicated in paragraph 1) above, and they can be used for example as semi-finished products for tires, in particular for treads.

The cross-linking is carried out at 150° C. for 40 min.

The results are set forth in Table 2 below.

TABLE 2

| COMPOSITION | A | B | D | E |
|---|---|---|---|---|
| Elastomer | SBR A | SBR B | SBR D | SBR E |
| Mn SBR | 155000 | 155000 | 165000 | 90000 |
| ML (1 + 4) rubber at 100° C. | 26 | 26 | 28 | non-measurable |
| Properties in the non-vulcanized state | | | | |
| ML (1 + 4) at 100° C. (Mooney "mix"") | 45 | 92 | 69 | 20 |
| Properties in the vulcanized state | | | | |
| Shore | 66.5 | 58.1 | 59.4 | 63.0 |
| ME10 | 5.53 | 3.52 | 3.88 | 4.81 |
| ME100 | 1.83 | 1.69 | 1.71 | 1.74 |
| ME300 | 2.09 | 2.31 | 2.32 | 2.17 |
| ME300/ME100 | 1.15 | 1.37 | 1.36 | 1.25 |
| Scott break index at 20° C. | | | | |
| BL | 18.9 | 23.4 | 23.7 | 20.2 |
| EB % | 575 | 533 | 570 | 553 |

TABLE 2-continued

| COMPOSITION | A | B | D | E |
|---|---|---|---|---|
| Losses at 60° C. (def. 40%) | 29.5 | 16.7 | 22.0 | 30.6 |
| Dynamic properties as a function of deformation | | | | |
| Delta G* at 23° C. | 4.21 | 0.78 | 0.88 | 0.89 |
| tan δ max at 23° C. | 0.335 | 0.186 | 0.190 | 0.175 |

As far as the properties in the cross-linked state are concerned, it will be noted, on one hand, that the ratio ME300/ME100 relating to compositions B, D, E (based respectively on SBR B, SBR D and SBR E) is greater than that relating to composition A and, on the other hand, that the hysteresis properties (at low deformations) are greatly improved compared with those of composition A. The hysteresis properties at high deformations are furthermore improved for the compositions B, D and E.

It will also be noted that compositions D and E according to the invention have values of Mooney "mix" which are distinctly less than that of composition B. These Mooney values are indicative of a processing ability which is significantly improved compared to that of the compositions based on known functional elastomers.

Composition E according to the invention (which is based on an elastomer of molecular weight of 90,000 g/mol having end COOH functions) has a very significantly improved processing ability, without deterioration of the hysteresis properties at low deformations (delta G* and tan δ max), relative to the processing ability and to the hysteresis properties of compositions B and D.

In other words, the elastomers SBR D and SBR E, which both comprise a COOH function at each chain end, impart to silica-filled compositions rubber properties which are close to those imparted by a composition also filled with silica by an elastomer functionalized by reaction with hexamethylcyclotrisiloxane, but with a significantly improved processing ability.

B. Compositions, the Reinforcing Filler of Which is a Silica-Modified Carbon Black In this example, four of the five elastomers of section I (SBR A, SBR B, SBR C and SBR D) were used for the preparation of rubber compositions of the passenger-car-tread type (respectively A', B', C" and D').

Each of these compositions A', B', C" and D' has the following formulation (expressed in phr: parts by weight per hundred parts of elastomer):

| | |
|---|---|
| Elastomer | 100 |
| Silica-modified black (1) | 60 |
| Aromatic oil "ENERFLEX 65" | 25 |
| Bonding agent (2) | 1.8 |
| ZnO | 2.5 |
| Stearic acid | 2.0 |
| Antioxidant (3) | 1.9 |
| Ozone wax "C32ST" | 1.5 |
| Sulphur | 1.4 |
| Sulphenamide (4) | 1.7 |
| Diphenylguanidine | 0.42 | with
(1) = "CRX 2000" from CABOT,
(2) = bonding agent "Si69" from Degussa,
(3) = N-(1,3-dimethylbutyl)-N'-phenyl-p-phenylenediamine, and
(4) = N-cyclohexyl-2-benzothiazylsulphenamide.

Each of these compositions A', B', C" and D' is produced, in a first phase of thermomechanical working, by two steps separated by a cooling phase, then, in a second, finishing, phase, by mechanical working.

There are introduced in succession into a laboratory internal mixer of the "Banbury" type, the capacity of which is 400 cm$^3$, which is 70% filled and the initial temperature of which is approximately 90° C., the elastomer, two-thirds of the reinforcing filler, the coupling agent, the diphenylguanidine and the stearic acid, then, approximately one minute later, the rest of the reinforcing filler, the aromatic oil and the anti-ozone wax "C32ST".

The first thermomechanical working step is performed for 4 to 5 minutes, until a maximum dropping temperature of about 160° C. is achieved. The elastomeric block is then recovered and cooled.

Then a second step of thermomechanical working is performed in the same mixer for 3 to 4 minutes, with addition of the antioxidant and all the zinc monoxide, until a maximum dropping temperature of about 160° C. is achieved.

The aforementioned first phase of thermomechanical working is thus effected, it being specified that the average speed of the blades during this first phase is 45 rpm.

The mixture thus obtained is recovered, is cooled and then, in an external mixer (homo-finisher), the sulphur and sulphenamide are added at 30° C., by mixing everything for 3 to 4 minutes (aforementioned second phase of mechanical working).

The compositions thus obtained are then calendered as indicated above, and they can be used for example as semi-finished products for tires, in particular for treads.

The cross-linking is carried out at 150° C. for 40 min.

The results are set forth in Table 3 below.

TABLE 3

| COMPOSITION | A' | B' | C" | D' |
|---|---|---|---|---|
| Elastomer | SBR A | SBR B | SBR C | SBR D |
| ML (1 + 4) rubber at 100° C. | 26 | 26 | 29 | 28 |
| Properties in the non-vulcanized state | | | | |
| ML (1 + 4) at 100° C. (Mooney "mix'") | 46 | 112 | 49 | 55 |
| Properties in the vulcanized state | | | | |
| Shore | 60.5 | 56.3 | 62.3 | 63.9 |
| ME10 | 4.49 | 3.37 | 4.75 | 5.03 |
| ME100 | 1.78 | 1.62 | 1.87 | 2.09 |
| ME300 | 2.48 | 2.72 | 2.58 | 2.90 |
| ME300/ME100 | 1.39 | 1.68 | 1.38 | 1.39 |
| Scott break index at 20° C. | | | | |
| BL | 18.7 | 20.3 | 20.5 | 20.9 |
| EB % | 435 | 410 | 480 | 425 |
| Losses at 60° C. (def. 35%) | 27.2 | 17.5 | 29.4 | 26.1 |
| Dynamic properties as a function of deformation | | | | |
| Delta G* at 23° C. | 2.82 | 0.68 | 2.23 | 1.76 |
| tan δ max at 23° C. | 0.307 | 0.198 | 0.282 | 0.245 |

As far as the properties in the vulcanized state are concerned, it will be noted that the hysteresis properties at low deformations of the compositions according to the invention C" and in particular D' (all based on elastomers SBR C and SBR D having COOH function(s), respectively) are improved compared with those of the reference composition A' (based on the non-functional elastomer SBR A).

It will also be noted that compositions C" and D' according to the invention have values of Mooney "mix" which are distinctly less than that of composition B' (based on the elastomer SBR B functionalized by hexamethylcyclotrisiloxane). These values are very close to that of composition A'. These Mooney values are indicative of a processing ability which is significantly improved compared to that of the compositions based on known functional elastomers.

In other words, the elastomer SBR D, which comprises a COOH function at each chain end, imparts to a composition filled with a silica-modified carbon black rubber properties in the vulcanized state which are close to those imparted to a composition filled in the same manner by an elastomer functionalized by hexamethylcyclotrisiloxane, and furthermore with a processing ability close to that imparted by a non-functional elastomer such as SBR A.

We claim:

1. A cross-linkable or cross-linked rubber composition which is usable for constituting a tire tread, comprising:
   an elastomeric matrix comprising at least one diene elastomer which comprises a carboxylic acid function at one or at each of its chain ends, and
   a reinforcing filler comprising a reinforcing inorganic filler,
   wherein said diene elastomer has a number average molecular weight which is greater than 80,000 g/mol, and comprises a majority quantity in said elastomeric matrix, with the proviso that when carbon black is present in the composition, it is only present when the reinforcing filler comprises a silica modified carbon black or a blend of a reinforcing inorganic filler and carbon black wherein carbon black is present in said blend in a mass fraction less than 50%.

2. The cross-linkable or cross-linked rubber composition of claim 1, wherein said diene elastomer is selected from the group consisting of a butadiene/styrene copolymer and a butadiene/styrene/isoprene copolymer.

3. The cross-linkable or cross-linked rubber composition of claim 1, wherein said reinforcing inorganic filler comprises a quantity equal to or greater than 40 phr (parts by weight per hundred parts of diene elastomer(s)).

4. The cross-linkable or cross-linked rubber composition of claim 3, wherein said reinforcing inorganic filler comprises a mass fraction greater than 50% of the reinforcing filler.

5. The cross-linkable or cross-linked rubber composition of claim 1, wherein said reinforcing inorganic filler comprises silica.

6. The cross-linkable or cross-linked rubber composition of claim 4, wherein said reinforcing inorganic filler comprises silica.

7. The cross-linkable or cross-linked rubber composition of claim 1, wherein said reinforcing inorganic filler comprises carbon black that is surface-modified by silica.

8. The cross-linkable or cross-linked rubber composition of claim 1, further comprising a reinforcing inorganic filler/diene elastomer bonding agent.

9. A process for the preparation of a cross-linked rubber composition, said rubber composition comprising:
   an elastomeric matrix comprising at least one diene elastomer having a carboxylic acid function at one or at each of its two chain ends, and
   a reinforcing filler comprising a reinforcing inorganic filler,
   wherein said diene elastomer has a number average molecular weight greater than 80,000 g/mol, and said elastomer matrix comprises a majority of said diene elastomer
   said process comprising
   thermomechanically working the constituents of the composition with the exception of a cross-linking system in a first phase at a maximum temperature of between 1300 and 200° C.,
   said first phase comprising:
   (a) mixing the composition constituents, with the exception of the antioxidant, with all the zinc monoxide to activate cross-linking and
   (b) mixing the product of with an antioxidant and with no zinc monoxide,
   and in a second phase, mechanically working the product of the first phase together with the cross-linking system at a temperature of less than that of the first phase.

10. A tread for a tire, comprising the rubber composition of claim 1.

11. A tire tread prepared according to the process of claim 9, wherein said tire -tread is formed of said rubber composition.

12. A tire having reduced rolling resistance, comprising the tread according to claim 10.

13. A tire having reduced rolling resistance, comprising the tread according to claim 11.

* * * * *